United States Patent [19]

Loeb et al.

[11] Patent Number: 4,849,905

[45] Date of Patent: Jul. 18, 1989

[54] METHOD FOR OPTIMIZED RETE PATTERN MATCHING IN PATTERN-DIRECTED, RULE-BASED ARTIFICIAL INTELLIGENCE PRODUCTION SYSTEMS

[75] Inventors: David J. Loeb, Campbell, Calif.; Keith R. Milliken, Croton Falls, N.Y.

[73] Assignee: International Business Machines Corporation, Armonk, N.Y.

[21] Appl. No.: 114,485

[22] Filed: Oct. 28, 1987

[51] Int. Cl.[4] .................. G06F 15/46; G06F 15/18
[52] U.S. Cl. ............................ 364/513; 364/200; 364/900; 364/300; 307/201
[58] Field of Search .............. 364/513, 200, 900, 300; 382/14, 15; 307/201

[56] References Cited

U.S. PATENT DOCUMENTS

4,599,692  7/1986  Tan et al. ........................ 382/15
4,670,848  6/1987  Schramm ........................ 382/15
4,704,695  11/1987  Kimura et al. .................. 382/15
4,761,746  8/1988  Tano et al. ...................... 364/513

*Primary Examiner*—Jerry Smith
*Assistant Examiner*—Paul Gordon
*Attorney, Agent, or Firm*—R. Bruce Brodie

[57] ABSTRACT

A demand-driven AI production system utilizing a RETE network for comparison matching in a condition/data match, rule-selection, and rule-firing execution cycle in which the RETE network is modified to maintain a list of instantiations satisfying the match conditions expressed in each node of the RETE network, passing of tokens to descendant nodes upon a comparison match, maintaining patterns to all ancestor nodes through which the tokens have passed, and traversing the patterns as a path for avoiding those RETE pattern matchings redundant between a previous match and a current match in progress.

4 Claims, 2 Drawing Sheets

RETE NETWORK FOR THE LHS OF SAMPLE-RULE

RETE NETWORK FOR THE LHS OF SAMPLE-RULE

FIG. 1

RULE ("WHEN") = ANTECEDENT (LHS) ⟶ CONSEQUENT (RHS)
STATEMENT

PATTERNS TO      BEGIN
                MATCH ON WM     ——— PROCEDURAL &
                                 END    DECLARATIVE
                                              STATEMENTS

CONFLICT SET
———————

| | ANTECD 1 | CONSEQ 01 | LHS & DATA MATCHES IN WM |
|---|---|---|---|
| DATA ⟶ | ANTECD 49 | CONSEQ 49 | |
| | ANTECD 17 | CONSEQ 17 | WHAT IS THE ORDER FOR RULE FIRING? |

PRODUCTION SYSTEM CONTROL CYCLE

F I G. 2

METHOD FOR OPTIMIZED RETE PATTERN MATCHING IN PATTERN-DIRECTED, RULE-BASED ARTIFICIAL INTELLIGENCE PRODUCTION SYSTEMS

TECHNICAL FIELD

The invention relates to artificial intelligence (AI) production systems, and more particularly, to a method for optimizing the pattern-matching phase of a cyclic, rule-based, data-sensitive AI production system.

BACKGROUND

It should be appreciated that the artificial intelligence branch of computer science has exhibited explosive growth in recent years. One facet of AI has been concerned with the modeling and use of inference systems. Such inference systems exploit the computer science formalism termed "rewrite" or "production" systems. At a minimum, a rewrite or production system includes an alphabet, an initial set of strings (axioms) defined over the alphabet, and a set of production or rewrite rules from which new strings (theorems) can be obtained.

Peter Jackson, "Introduction to Expert Systems", Addison-Wesley Publishing Co., copyright 1986, pp. 29–51 and 126–141, points out that an AI production system comprises a rule set (sometimes called production memory), a rule interpreter that decides how and when to apply the rules, and a working memory that holds data, goals, and intermediate results.

Brownston et al, "Programming Expert Systems in OPS5", Addison-Wesley Publishing Co., copyright 1985, pp. 4–31, contrast a rule-based production computational model with that of a procedural model. More particularly, Brownston describes a production system as an executable set of production rules in which each rule in such a system represents an ordered pair of a condition (state set) and action statements. This leads to Brownston's characterization of a production system as an unordered finite sequence of data-sensitive production rules.

| Brownston's Comparison | |
|---|---|
| Production System Model of Computation | Procedural Model of Computation |
| Program Description: A description of data expressed as objects, attributes, and values, and an unordered finite sequence of rules that can be referenced by the data. Each rule consists of a condition/pattern part and an action part. | Program Description: An ordered list of instructions written in a language with a well-defined syntax and semantics. The list has a specified beginning. The language includes a stop/halt instruction or punctuation whose meaning is to cease instruction execution. |
| Execution: Requires maintenance of a global data base containing the problem description and any modifications, additions, or deletions thereto and a recognize, resolve, act (RRA) or match, select, execute cycle. The cycle: | Execution: The instructions are directly executable. The first instruction in the list initiates execution. After this, execution proceeds in sequence punctuated by conditional branches until a stop or halt instruction is encountered. |
| (a) identifies that subset of rules having a condition or pattern part matching the data, (b) selects at least one rule from the identified subset of rules according to an extrinsic protocol, and (c) executes (fires) the action prescribed by the action part of the selected rule including modification to the data base. | |

In addition to Jackson and Brownston, reference should also be made to:

(1) Miranker, "TREAT: A Better Match Algorithm for AI Production Systems", Proceedings of the AAAI-87 Sixth National Conference on Artificial Intelligence, Vol. 1, July 13–17, 1987, pp. 42–47.

(2) Miranker, Dept. of Computer Science, University of Texas at Austin, Report TR-87-03, January 1987.

(3) Forgey, "OPS5 Users Manual", CMU-CS-81-135, copyright 1981.

(4) Forgey, "Rete: A Fast Algorithm for the Many Pattern/Many Object Pattern Match Problem", Artificial Intelligence, Vol. 19, copyright 1982, pp. 17–37.

(5) Schor et al, "Advances in Rete Pattern Matching", Proceedings of AAAI '86.

(6) Chambers et al, "Distributed Computing", Academic Press, copyright 1984, pp. 10–19.

(7) Aho et al, "Compilers: Principles, Techniques, and Tools", Addison-Wesley Publishing Co., copyright 1986, pp. 608–632.

Brownston, Miranker, Forgey, and Schor describe pattern-driven, forward-chaining production systems using a matching-rule, select-rule, execute-rule cycle based on the OPS5 AI language. Furthermore, these references point out that the process of many data-object/many pattern matching is the most computationally intensive phase in the production system control cycle.

The references teach several techniques for reducing the computational intensity of the pattern-matching phase. First, advantage can be taken of the temporal redundancy of the data objects resident in working memory. That is, the set of objects over which the pattern portions of the rules are compared can be limited to those objects in working memory which have been either created or modified since the last cycle. Second, the many object/many pattern comparison can be systematized through use of sorting or dataflow-like processing networks. While there are other comparison algorithms, such as Miranker's TREAT, the best known comparison method having these attributes is the RETE algorithm ascribed to Forgey.

Forgey and Jackson discuss the RETE pattern/object matching method used in the AI production system control cycle. This method includes:

(a) compiling the condition elements of the pattern portion of a rule into an augmented data flowgraph (see Aho and Chambers) or a comparison sorting network (Forgey);

(b) comparing each object with conditions of the pattern as expressed in the compiled network over a set of nodes (alpha-nodes) that each test one object at a time;

(c) passing tokens indicative of a match from antecedent nodes to descendant nodes (beta-nodes) joined on a pattern-determined basis, comparing each token received at a descendant node, and passing tokens on to descendants in turn until the paths through the flow-graph are traversed; and (d) maintaining a list of instantiations satisfying the match conditions expressed at each node.

In the remainder of this specification, the terms MAKE and CREATE, MODIFY and UPDATE, and REMOVE and DELETE will be used interchangeably. Also, the RECOGNIZE, RESOLVE, and ACT phases of the AI production system control cycle serve as synonyms for MATCH, SELECT, and EXECUTE.

SUMMARY OF THE INVENTION

It is an object of this invention to devise a method for optimizing the pattern-matching phase of a cyclic, rule-based, data-sensitive production system.

It is a related object to devise a method in which a path through a RETE network used during the comparison phase can be traced, thereby minimally invoking the comparison, token passing, and recording aspects of the RETE algorithm.

It is yet another object to devise a method utilizing the path for deletion of an object, including removal of any counterpart instantiations recorded at the lists maintained by various nodes through which a token has passed.

It is a further object to devise a method in which alteration of objects by a MODIFY command is accomplished as a function of the DELETE and MAKE commands and their associated processes.

The aforementioned objects are satisfied by the method steps executed during the pattern-matching portion of the matching, selection, and execute cycle of an AI production system comprising: (a) compiling a RETE network of the condition elements of the pattern portion of the rule being matched, the join nodes of said network being grouped in a pattern-determined associative manner; and (b) applying those data objects created or modified in the immediately preceding cycle to said RETE network.

The method includes the further steps at each node of: (b1) maintaining a list of instantiations satisfying the match conditions expressed at that node, (b2) passing tokens to descendant nodes upon an object/pattern comparison match, (b3) maintaining pointers to all ancestor nodes through which the token for each object passed, and (b4) traversing said pointers as a path for avoiding those RETE node pattern/object matchings redundant between a previously matched object and an object being processed.

DESCRIPTION OF THE PREFERRED EMBODIMENT

In order to enhance appreciation for the method of this invention, a description of the generation, function and use of the RETE comparison algorithm and supporting data structures according to the prior art will be set out. Following this is a discussion of the invention utilizing the data structures. Lastly, a pseudo-code implementation and description is presented.

Classic RETE Processing

Reference should be made to previously cited Forgey, Brownston, and Miranker publications for implementation and additional details. The example discussed is a scheduling application involving parts and machines.

Suppose there is a company that manufactures parts, that the company has two machines A and B, that there are two types of parts (P and Q) manufactured by the company, and that to complete a part of type P, machine A and then machine B must be used; while to complete a part of type Q, machine B and then machine A must be used.

Suppose there is interest in a computer program that does production scheduling (deciding which parts should be routed to which machines) as the work progresses.

Machines will be represented by records matching the following data declaration:

```
Declare machine,
    type,
    state.
```

Here "type" and "state" are attributes or fields in the machine record. "Type" may have the value "A" or the value "B"—representing the type of machine, and "state" may have the value "AVAILABLE" or "BUSY"—representing the current availability of the machine to accept a part to begin processing.

In this example, data-driven production system techniques as well as terminology common to such systems are used. Specifically, many records will be able to co-exist, each satisfying the declaration above. The collection of all records satisfying any one such declaration will be called a "class". Each individual record will be called a "class member". The overall collection of all class members from all classes will be called "working memory".

Each part (partially or fully complete) will be represented in the system by class members (records) satisfying the following declaration:

```
Declare part,
    type,
    state,
    next-machine-needed.
```

Here "type" can have the values "P" or "Q", while "state" must be "in-process", "waiting", or "complete", representing that a part must at any instant be either in the process of being machined, or waiting for a machine, or through with all needed machining.

Suppose also that occasionally the company gets express orders that must be expedited. Such orders are of very high priority, and although the machining of a nonexpress part will not be interrupted to make the machine available for an express part, the company's policy is that while there is an express part in the system that will need a machine in the future, that machine will not start any nonexpress work—thus increasing the likelihood that the machine will be available or near becoming available when it is needed for an express part. The declaration for a class member that would represent an express order might look like the following:

```
Declare express-order,
part-type,
state,
array-of-all-machines-needed,
index-of-next-machine-needed.
```

Using data-driven, forward-chaining, condition-action rules (or productions) to encode the routing of parts to machines, one rule in the computer program might look like the following when paraphrased in English:

```
Sample-rule:
When
there is a machine - which shall be called M
such that M is available
and there is a part - which shall be called O
such that the part is waiting for its next
machining step and
the next machining step required for O must be
done on the machine M
and there are no express parts that satisfy both
the part is not complete, i.e., it is waiting
or in-process and
the part will need machine M before it is
complete
Then take the following actions:
change the state of M to BUSY
change the state of O to IN-PROCESS
route the part O to the machine M for processing.
```

The list of conditions between the 'When' and the 'Then' in the rule is called the antecedent or left-hand side (LHS) of the rule. The actions to be taken when the LHS is satisfied by some list of class members is called the consequent or right-hand side (RHS).

There would be many other rules in such a system, and there would be a method for notifying the computer program whenever a machine completed its work on a part.

Figure 1:
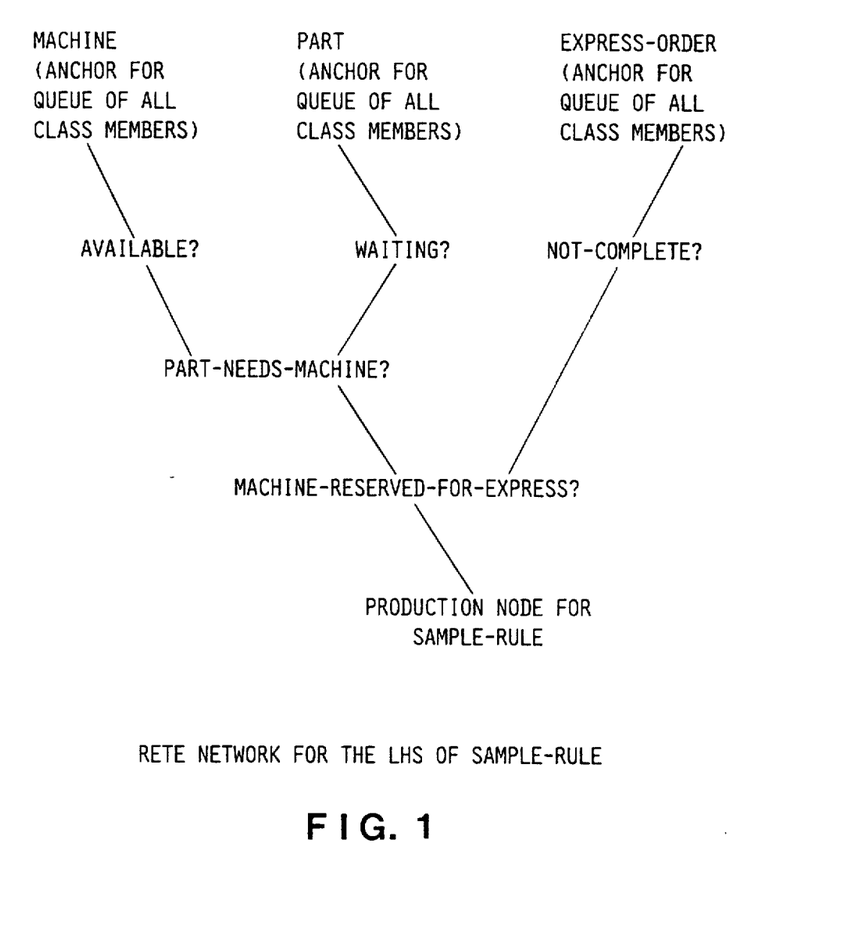
FIG. 1 depicts a directed graph RETE network produced during compilation of the pattern portion (left-hand side) of the sample rule.

Referring now to FIG. 1, there is shown a RETE network for the LHS of the Sample-Rule. All arcs are directed and are considered as pointing down in the above picture. RETE processing starts at the top nodes (class anchors) and flows downward through the network. The nodes marked MACHINE, PART, and EXPRESS-ORDER are, respectively, anchors for queues of all machine, part, and express-order class members that exist in the program at that point in time.

Changes to machine, part, or express-order class members can be of several kinds. New members can be created, representing new objects that the system should consider in routing parts to machines. Class members can be destroyed, representing the deletion of some object from participation in the system. For example, when a part is shipped to a purchaser, it might be natural to delete the class member representing that part from the system, as it should no longer be considered in any decisions about scheduling. Changes can also be made to existing class members. Different values are assigned to the attributes of the class member. This is done to represent changes in state, etc.

Each time a change is made to working memory that change is passed through the RETE network. In rough terms, the central nodes of the network fragment in FIG. 1 correspond to tests that must be performed to determine what lists of class members satisfy all the conditions in the LHS of the Sample-Rule above. Class members arranged in lists are tested at a node to determine which lists satisfy the corresponding conditions and, for each node, summary information is retained in a queue based at that node. Usually, the retained information indicates which lists of class members passed the test associated with the node.

The nodes labeled AVAILABLE?, WAITING?, and NOT-COMPLETE? are called alpha-nodes. Alpha-nodes correspond to tests that only mention a single class member. These nodes have only one incoming arc in the RETE network.

The nodes labeled PART-NEEDS-MACHINE? and MACHINE-RESERVED-FOR-EXPRESS? are called beta-nodes. In this RETE network, the beta-nodes all have two incoming arcs and correspond to tests that determine whether a list of several class members satisfies a condition. For example, the node labeled PART-NEEDS-MACHINE? corresponds to a test that determines whether a pair of class members, the first a part and the second a machine, is such that the next-machine-needed field on the part class member is identical to the type filed of the machine class member. In other words, when given a part and a machine, the node determines whether the part needs to go to that machine next.

If a pair (or, in general, a list of any length) of class members satisfies a test, that fact is recorded in a control block which shall be called a Satisfaction Block (SB). The SB is placed in a queue that is anchored at the RETE node and becomes a record of what lists of objects satisfied the conditions associated with that node. The declaration for a simple SB might look like the following:

```
Declare satisfaction-block,
next-SB-in-queue,
list-of-class-members;
``` where the specified list-of-class-members field indicates a list of class members which together satisfy the test associated with the node.

Lists of objects that satisfy the conditions associated with a node are candidates that need to be considered for satisfaction of later conditions. To make all the needed tests, while restricting consideration to just those lists of class members that have satisfied all earlier tests, a computational strategy is adopted that pushes tokens through the RETE network (top to bottom when the network is drawn, as in FIG. 1). A token represents a change to some SB and reflects processing that must be done at a successor node. Tokens might satisfy the following declaration where the phrases following the '/*' on any line are comments:

```
Declare token,
change-type,          /* MAKE or DELETE
list-of-class-members,   /* list of one or more class
                      /* members
```

| | |
|---|---|
| node, | /* identifies node where |
| | /* tests will be attempted |
| direction; | /* ancestor that passed the |
| | /* token is LEFT or RIGHT of |
| | /* the node in the token |

The declaration of a token includes a direction field which can be set to have one of two values, LEFT or RIGHT. It shall be assumed that all the RETE networks under discussion satisfy the following principles:

A node with only one incoming arc is always viewed as having its one ancestor as a left ancestor.

Where a node has two ancestors (a beta-node) and each ancestor is an alpha-node or is an anchor to a class, then one ancestor can be arbitrarily picked as the left ancestor, while the other will be the right.

Where a beta-node has one ancestor that is a beta-node, then that ancestor shall be called the left ancestor, and the other ancestor (which in the example and in most implementations must be an anchor or alpha-node) becomes the right ancestor.

The use and flow of tokens are illustrated by examining the processing that would take place in the sample RETE network of FIG. 1. Suppose the process is started with an empty working memory. The RETE network of FIG. 1 does not contain any satisfaction blocks. Further, suppose that during initialization of the execution of the program containing the rule above, the first machine class member is created, representing machine A. Since there is no work yet for the machine to do, the state field on the class member would be set to AVAILABLE.

For each successor in the RETE network of the machine anchor node, a token would be created that contains a list of one class member—the new machine class member—in its list-of-class-members field. In the current example, there is only one node that is a successor of the machine anchor node. Thus, only one token would be generated, and it would point to the new machine for its list-of-class-members field. It would point to the AVAILABLE? node for its node field, and it would specify that the token arrived at the AVAILABLE? node from a LEFT ancestor. The token would contain MAKE in its CHANGE-TYPE field, indicating that the new class member was just created.

Typically, if there are many tokens generated at once, they are placed on a stack and processed one at a time. In this simple case, only one token has been generated, so the processing for that one token would immediately proceed. (Typically, the token would be pushed on the token stack but soon thereafter would be popped off.)

This processing done at the node would include executing the test associated with the node for the machine (class member) in the token. In this case, the newly created machine would be tested to see whether its state field listed it as available—which it would be. Thus, the test associated with the node would be passed and several actions would be taken. First, a Satisfaction Block would be created to record that the list of class members in the token passed the test. In this case, the new SB would point to the one new machine class member. Second, new tokens with change-type of MAKE would be generated, one for each successor of the AVAILABLE? node. Again, in this simple case, there is only one successor to the AVAILABLE? node so a token is stacked that specifies (a) machine A, (b) the PART-NEEDS-MACHINE? node, and (c) LEFT.

Again, since there is only one node on the stack, processing for that node immediately proceeds. However, a list of a machine and a part is required to satisfy the PART-NEEDS-MACHINE? node, and there are no parts in existence yet. Thus, there is no more processing that can be done at this time, so control is returned back to the application.

Suppose that the next action taken by the application during this initialization phase is to create the second machine; namely, machine B. As before, a token would be generated to cause testing at the AVAILABLE? node to determine whether this machine is available—which it would be. An SB is created so that there are now two SBs in the queue off the AVAILABLE? node. Since nothing more can be done, control (as before) returns to the application.

Suppose that the application begins normal operation, and scheduling for the first part is to start. The application makes a part class member to represent the existence of the first part, a type P part that is waiting to be machined. Since type P parts must first be machined by machine A, the part's NEEDS-MACHINE field is set to A. Again, a token with change-type of MAKE is generated, indicating this change. The token would point to the new part, specify the WAITING? node, and the left direction.

Processing of the token at the WAITING? node would discover that the part was indeed waiting, so an SB would be created and enqueued off the node and a new token would be created (and pushed onto the stack), indicating that this new part needs to be tested at node PART-NEEDS-MACHINE? where the arrival is from the right.

With only one token on the stack, it is popped off and processing for that token proceeds immediately. A machine and a part are now needed to perform the test associated with the condition at a beta-node (the PART-NEEDS-MACHINE? node). There are two machines, A and B, which have previously arrived in tokens at the PART-NEEDS-MACHINE? node. This fact is recorded by the existence of two SBs enqueued off the AVAILABLE? node, which is the left ancestor of the current node. Thus, a loop is executed that walks through all SB blocks off the AVAILABLE? node.

For each such SB, the test is performed at the PART-NEEDS-MACHINE? node to determine if the new part (of type P) needs the machine in the SB for its next machining step. If the test (PART-NEEDS-MACHINE?) fails, then no additional action is taken. If the test passes, then a new SB is created and enqueued off the PART-NEEDS-MACHINE? node. In this case, the test of the type P part with machine B fails, and the test with machine A passes. Thus, an SB with a list of class members comprised of machine A and the new type P part is enqueued off the PART-NEEDS-MACHINE? node, and a token representing this change to PART-NEEDS-MACHINES?'s SB queue is generated for the one successor of this node. The change made to PART-NEEDS-MACHINE?'s SB queue is the creation of a new SB. Thus, the new token is a MAKE token, and its list of class members includes the A machine and the new P part.

PART-NEEDS-MACHINE? is an example of a positive beta-node. When a MAKE token arrives at such a node from one direction, the list of class members in the token is successively augmented with the list of class members from each SB off the predecessor node in the opposite direction. For each such SB, the test for the current node is performed using the augmented class member list. A passed test causes more tokens to be generated—one for each successor node. These new tokens are MAKE tokens that represent new candidates at successor nodes.

This token is popped off the stack, having arrived at the MACHINE-RESERVED-FOR-EXPRESS? node from the left. This node is a negative beta-node. Unlike positive beta-nodes, the output of a negative beta-node is not an augmented token. A token arriving at a negative beta-node from the left includes a list of class members. This same list is either passed intact to all successor nodes, or it is stopped altogether.

The list is passed on (in tokens) if no test passes at this node involving this class member list augmented by any one of the lists in the right ancestor's SB queue. This list is stopped and not passed to any successor if some test passes at this node when the arriving list is augmented in turn by each of the lists from the right ancestor's SB queue.

Negative beta-nodes are often discussed in the following terms. Class member lists that arrive from the right will stop class member lists arriving from the left from passing through. Thus, a negative beta-node is much like a gate, where the things arriving from the right (according to what tests pass and fail) determine whether things arriving from the left will pass through.

It should be noted that the arrival from the right of a DELETE token (indicating the deletion of an SB from the right ancestor's queue) at a negative beta-node can cause creation of a new SB at the negative beta-node and the corresponding generation of MAKE tokens for all successors of the negative beta-node. This happens when the arriving token indicates deletion of the only SB in the right ancestor's queue that was stopping some SB in the left ancestor's queue. Likewise, a MAKE token arriving from the right can stop an SB that is in the negative beta-node's SB queue, and the MAKE token can cause the removal of an SB and the generation of DELETE tokens for all successors.

In this example, the right ancestor of the MACHINE-RESERVED-FOR-EXPRESS? node is the NOT-COMPLETE? node. There are no express orders, so there can be no express orders with the part not complete. Therefore, there is nothing in NOT-COMPLETE?'s SB queue, and there is nothing that will stop any list of class members (in a token) arriving from the left from passing on through. Thus, arrival of a MAKE token from the left causes a new MAKE token to be generated and passed to the production node.

There is only one production node shown. However, in a real RETE network, there is one production node for each rule. Whenever a token arrives at a production node, the arrival indicates some change to the conflict set for that rule. A MAKE token arriving at a production node indicates that a new instantiation should be created. A DELETE token arriving indicates that an existing instantiation should be eliminated.

In this example, the arrival of the MAKE token at the production node indicates that a new instantiation should be made. Indeed, the pair of class members consisting of machine A and the one part of type P satisfies the conditions of the Sample-Rule based on all the class members that exist at this time. Thus, this one instantiation would normally become a candidate for firing with all other instantiations of other rules. If the rule did fire, then the action part of the rule would change the status of both the P type part and of machine A. Those changes, when pushed through the RETE network, would invalidate this on instantiation to Sample-Rule.

Next, the RETE processing is examined in more detail for this case. As expressed before, this example merely illustrates the prior art.

Suppose that the single instantiation is selected and Sample-Rule does fire. The first action taken is to change the status of machine A to BUSY. This change in machine A's state field with the classic RETE algorithm would be treated as a deletion of the old machine class member, followed by the creation of a new machine class member that is identical to the old one except for the altered value in the state field—the new value being BUSY.

If the machine A class member is deleted, then before the class member is destroyed, a DELETE token is created for the AVAILABLE? node with the token pointing to the machine A class member. As always, the token is stacked with any other tokens. When popped and processed for the AVAILABLE? node, the test associated with the AVAILABLE? node is repeated to determine whether the class member passed or failed the test when it was created. If the current test passes (or fails), then the original test must have likewise passed (or failed, respectively) when the MAKE token was processed.

If the earlier test did fail, there was no additional RETE processing generated by the token. No SB block was made, and no new tokens were spawned. Thus, there is nothing more that need be done now, as there are no descendant references in the RETE network that must be removed to reflect deletion of the class member.

If the earlier test passed, then there must be a record of the fact in the SB queue for the node. This is found by searching the queue, i.e., walking through all the SB blocks in the queue until one is found with a class member list that is identical to the class member list for the current token. This SB block is then dequeued and destroyed. Also, the fact that the test passed indicates that additional tokens were made when the machine A class member was created, and those tokens must be sought out and destroyed since they mention (typically, they point to) a class member that is being destroyed. A new token (a DELETE token) is created for each successor to the current node, and these are all placed on the stack for later processing.

In summary, processing for a DELETE token exactly token. All tests are repeated. When a test is passed, there is an additional expense of searching for the right SB to excise. When a DELETE token arrives at a positive beta-node from one direction, it must be paired with all class member lists from SBs enqueued off the opposite ancestor. For each test that passes, the SB in the current block must be found and excised, and new tokens must be sent to successors. Processing of a DELETE token at a negative beta-node likewise undoes the work of a MAKE token.

The computational expense of processing DELETE tokens is greater than that for processing MAKE tokens. It is frequently necessary to do an additional search of the SB queue at a node to find and excise the appropriate SBs.

RETE Processing as Modified According to the Invention

It was unexpectedly observed that if additional information links were maintained in an SB with its successor SBs, then those SBs that mention the same class member list as in the original SB could immediately be deleted if the original SB were deleted. The process for creating new SBs is largely unchanged, other than the responsibility for saving the additional information. However, in the resulting structure, a class member is the root of a tree of all SBs (and instantiations) that mention the class member, the class member itself being treated like an SB enqueued off an anchor node. Thus, deletion of all SBs (and instantiations) that mention the class member is largely a matter of walking a tree and excising all SBs encountered.

The algorithm can be implemented so that no test is ever repeated. This reduction in the total number of tests to execute RETE processing is especially important when tests are slow to execute; for example, when class members are stored on a slower storage medium, and accessing class members for testing is computationally expensive. Also, with the invention described herein, no searching of SB queues is required to find the SBs to be excised. This can markedly speed up execution of RETE processing, depending on the length of the SB queues. In this invention, an SB might have the following declaration:

```
Declare improved-satisfaction-block,
next-sat-block-in-queue           /* used to enqueue this
                                  /* block in the doubly-
previous-sat-block-in-queue       /* linked list of all
                                  /* SBs for this node
list-of-class-members,            /* list of members
                                  /* passing test of node
left-descendant-SB,               /* points to any left
                                  /* descendant or is
                                  /* null
left-ancestor-SB,                 /* left ancestor
                                  /* pointer, null if no
                                  /* lf anc
next-left-sibling-SB,             /* doubly-linked list
                                  /* of all SBs with the
previous-left-sibling-SB,         /* same left ancestor
right-descendant-SB,              /* points to any right
                                  /* descendant, or null
right-ancestor-SB,                /* right ancestor pntr,
                                  /* null if no rght anc
next-right-sibling-SB,            /* doubly-linked list
                                  /* of all SBs with the
previous-right-sibling-SB;        /* same right ancestor
```

If node N is a successor of node M in a RETE network (i.e., there is an arc from M to N), and if X is an SB queued off M, and Y is an SB queued off N so that the class member list in X is an initial or terminal segment of the list in Y—so that the deletion of X would cause (using classic RETE processing techniques) tokens to be generated that would result in the deletion of Y, then say that Y is an immediate descendant or a successor of X, and say that X is an immediate ancestor or a predecessor of Y.

If M is a left (or right) predecessor of N, then say that X is a left (or right, respectively) predecessor of Y, and Y is a left (or right, respectively) successor of X. If N is a beta-node, there may be many SBs enqueued off N that are all immediate descendants of the same SB enqueued off M. However, a given SB can have at most one left and at most one right immediate ancestor.

Fields similar to those added to the SB declaration in order to arrive at the improved SB declaration (but excluding ancestor pointers) can be associated with each class member. Thus, in all particulars, a class member itself can be treated like an SB insofar as handling creations and deletions. Likewise, fields similar to those in an improved SB (excluding those that point to descendants) can be added to instantiations, as instantiations record what lists of class members pass through production nodes and they are similar to and treated like SBs.

The sibling fields in an improved satisfaction block are used to form a doubly-linked (usually circular) list of all SBs that have a common immediate ancestor. The left and right descendant fields point respectively to any left/right descendant. The left and right ancestor fields are each either set to point to the appropriate ancestor SB if such exists, or are set to a null value if no such ancestor SB exists.

When a MAKE token is being processed at either an alpha or a positive beta-node and a test is passed, all ancestor SBs are known and all the fields in an improved SB can be easily set to the correct values. When a delete of a class member is being processed, a depth-first walk of the descendant SB tree can be executed, and each SB can be deleted from the doubly-linked queue of sibling SBs. If that deletion exhausts the sibling queue, then the predecessor SB's descendant field can be set to null. If the predecessor SB's descendant field points to the deleted SB and the sibling queue is not depleted by the deletion, then the ancestor SB's descendant field can be set to point to another descendant SB. Once an SB is no longer referred to (pointed to) by any other SB, it can safely be destroyed. Care must be taken to eliminate all left and all right descendants of any SB that is going to be deleted.

Processing at negative beta-nodes can be done in several ways. However, it is not possible to simply follow an immediate translation of the above-described techniques into the world of negative beta-nodes. The problem in using the classic approach to processing at negative beta-nodes is that a complete record is not maintained of the result of every test performed at a negative beta-node. With the processing for positive beta-nodes, as described above, every passing test is recorded in an SB. A failing test is recorded by the nonexistence of an SB.

In contrast, the SB queue for a negative beta-node (with the classic algorithm as earlier described) is a subset of the SB queue for the left ancestor node. An SB is created and kept (off the negative beta-node) exactly in those cases where no SB in the right ancestor's queue passes the test when paired with the SB from the left ancestor. Thus, the results of all tests involving SBs that appear in the negative beta-nodes's SB queue are known; namely, all such tests failed. However, if an SB from a left ancestor does not reappear in the negative beta-node's SB queue, then there is no information retained about which SB or SBs from the right ancestor node stopped the left arriving SB by passing the test when the left and right SBs were coupled together.

Since negative beta-nodes tend to be significantly less common than positive beta-nodes, it is possible to treat them using an approach similar to that in the classic RETE processing while still obtaining marked speed improvements for most applications. Using this approach, the elimination of an SB from a node that is a right ancestor of a negative beta-node would trigger the spawning of DELETE tokens that would be passed on to the negative beta-node and processed in the classical way.

It is also possible to keep additional information at each negative beta-node about which SBs from the right stop which SBs arriving from the left. This can be done, for instance, by keeping a list (the standard SB queue for the negative beta-node) of all left arriving SBs that are not stopped, and also by keeping another list of all left arriving SBs that are stopped and keeping with each entry in that list another list of all the right arriving SBs that stop the associated left arriving SBs. Blocks in this new list might be called Stopping SB Blocks, or SSBBs. In this case, fields similar to those in the improved-satisfaction-blocks (outlined above) can be used to link SSBBs to their ancestor SBs. While the details of the algorithm are different for processing at positive and negative beta-nodes, the general approach is similar to that outlined above for the processing done a alpha and positive beta-nodes.

Pseudo-code Implementation and Comment

One use of the RETE algorithm and of the method of this invention is in the implementation of the pattern matching for data-driven production systems. The control cycle for such a system is shown with reference to FIG. 2. In that environment, when a program is first initialized, the RETE network for the set of rules in the application must be built. However, the invention relates to modifications to a RETE network once built, and the following discussion assumes that one has already been compiled.

Figure 2:
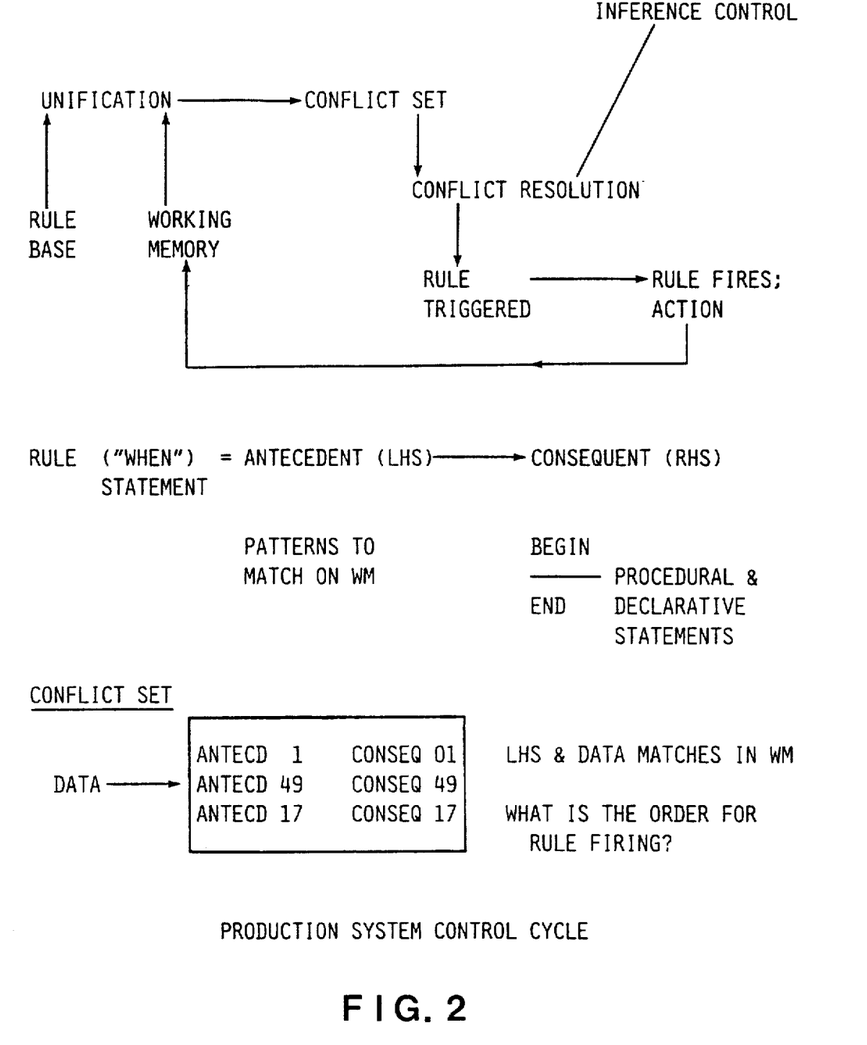
FIG. 2 shows a block diagram of the prior art logical machine as executed on any general purpose, stored program-controlled digital computer upon which the method of the invention may be practiced.

The fundamental loop or cycle of execution for a data-driven production system is the Match-Resolve-Act cycle. This is illustrated in FIG. 2 and set out in the pseudo-code outline as follows:

```
Some initial conflict set (set of all instantiations)
is given;
Do Forever;
Call conflict-resolution;
/* select the best instantiation to fire
If there is a best instantiation
Then Do;
Fire the best instantiation;
/* Note that during the course of firing the
/* instantiation, the action code will initiate
/* changes to working memory. The application
/* code will call MAKE, DELETE, and MODIFY to
/* notify the RETE algorithm about changes to
/* working memory, and the RETE algorithm will
/* push these changes through the RETE network
/* in order to compute the resulting changes
/* to the conflict set.
MAKE, DELETE, and MODIFY may be called by the
action part of a rule during the execution of
the action part of the rule;
End;
Else Do; /* the conflict set is empty
Return to the user of the application and allow
him to terminate execution or to interactively
change working memory and therein initiate calls
to MAKE, DELETE, or MODIFY;
End;
End;
```

The heart of the RETE processing is thus in the routines MAKE, DELETE, and MODIFY. These routines are notified of changes to working memory, and they push those changes through the RETE network and thereby compute the corresponding changes to the conflict set. An outline of these routines follows.

As derived from the illustrative example in the previous section, the data structures that correspond to the following declarations shall be used:

| Declare token | |
|---|---|
| list-of-class-members, | /* list of one or more |
| | /* class members |
| node, | /* identifies node where |
| | /* tests will be attempted |
| direction; | /* ancestor that passed the |
| | /* token is LEFT or RIGHT |
| | /* of the node in the token |

It should be noted that tokens will only be used for MAKE-type actions in the outlined implementation; thus, there is no change-type field in this declaration of a token.

The declaration of a Satisfaction Block (SB) should be formatted as:

| Declare improved-satisfaction-block, | |
|---|---|
| next-sat-block-in-queue | /* used to enqueue this |
| | /* block in the doubly- |
| previous-sat-block-in-queue | /* linked list of all |
| | /* SBs for this node |
| list-of-class-members, | /* list of members |
| | /* passing test of node |
| left-descendant-SB, | /* points to any left |
| | /* descendant or is |
| | /* null |
| left-ancestor-SB, | /* left ancestor |
| | /* pointer, null if no |
| | /* lf anc |
| next-left-sibling-SB, | /* doubly-linked list |
| | /* of all SBs with the |
| previous-left-sibling-SB, | /* same left ancestor |
| right-descendant-SB, | /* points to any right |
| | /* descendant, or null |
| right-ancestor-SB, | /* right ancestor pntr. |
| | /* null if no rght anc |
| next-right-sibling-SB, | /* doubly-linked list |
| | /* of all SBs with the |
| previous-right-sibling-SB; | /* same right ancestor |

The declaration of a Stopped SB Block (SSBB) consists of:

| Declare stopped-SB-block, | |
|---|---|
| next-SBBB-in-queue, | /* used to enqueue this |
| | /* block in the doubly- |
| previous-SSBB-in-queue, | /* linked list of all |
| | /* SSBBs for this node |
| left-ancestor, | /* points to stopped SB |
| next-left-sibling, | /* doubly-linked list of |
| | /* all SBs and SSBBs |
| previous-left-sibling, | /* with same left ancestor |
| right-ancestor, | /* points to stopping SB |
| next-right-sibling, | /* doubly-linked list of |
| | /* all SBs and SSBBs |
| previous-right-sibling; | /* with same right ancestor |

MAKE is passed a pointer to a just created class member and an identifier of the class. It computes the corresponding changes to the conflict set.

```
MAKE(class-member,class-identifier);
Locate the anchor for the class specified by the
class-identifier;
Enqueue the newly created class member in the class
member queue for the class (the queue is based at
the anchor for the class);
Create a token and push it onto the token stack
with class-member as its (length one) list of
class members
```

```
with the anchor for the class as its RETE node
with LEFT direction;
Call MAKE-PROCESS to do the RETE processing;
/* the input to MAKE-PROCESS is the token stack
Return to the caller;
End MAKE;
```

DELETE is passed a pointer to the class member that is to be deleted. DELETE computes the corresponding changes to the conflict set. Thereafter, it frees up the storage being used by the class member.

```
DELETE(class-member):
Call DELETE-PROCESS(class-member);    /* do the RETE
                                      /* processing
Free class-member's storage block;
End DELETE;
```

MODIFY is passed a pointer to the class member that is to be changed. It is also passed a description of the field that is to change, and it is passed the new value that is to be assigned to the field. MODIFY will delete the old copy of the class member insofar as the RETE algorithm is concerned. Then it makes the indicated change to the class member, and does the RETE processing to reflect the creation of a new class member replacing the old one, but with the one field changed.

```
MODIFY(class-member,class-identifier,
field-identifier,new-value-for-field):
Call DELETE-PROCESS(class-member);
Assign new value to field to be changed in
class-member;
Call MAKE(class-member,class-identifier);
End MODIFY;
```

Thus, it can be seen that the heart of the processing takes place in the two routines MAKE-PROCESS and DELETE-PROCESS. These routines are outlined in pseudo-code. First, consider the MAKE-PROCESS routine. As mentioned before, the input to MAKE-PROCESS is the token stack, and MAKE-PROCESS is driven by the token stack. When that stack is empty, then MAKE-PROCESS's work is complete and it returns to the caller.

```
MAKE-PROCESS:
Do while token stack is not empty;
  Pop the top token off the token stack and call it
  this-token;
  If node of this-token is a class anchor (so token
  list is a list of one SB and it is a class
  member)
  Then Do;
    /* use SET-SB-AND-SEND-ON to create SB
    /* recording passed test and to generate
    /* tokens for each successor of anchor
    Call SET-SB-AND-SEND-ON(anchor node, list of
    one class member - same as list in this-
    token, null, null);
  End;
  Else
  If node of the token is an alpha-node
  Then Do;
    Execute the test associated with the node for
    the one class member in the class member
    list of this-token;
    If the test passed
    Then Do;
      /* use SET-SB-AND-SEND-ON to create SB
      /* recording passed test and to generate
      /* tokens for each successor of anchor
      Call SET-SB-AND-SEND-ON(node of this-token,
      class member list of this-token, left
      ancestor SB, null);
    End;
    /* else the test failed, and we do nothing
    /* more for this-token
  End;
  Else
  If node of the token is a positive beta-node
  Then Do;
    Do for each SB in the SB queue of the
    ancestor in the opposite direction from
    that of the arriving token;
      Form an augmented list by concatenating the
      list of class members from the SB with
      the list of class members from this-
      token;
      Execute the test associated with this node
      for the augmented list;
      If the test passed
      Then Call SET-SB-AND-SEND-ON(node of this-
      token, augmented list, left ancestor SB,
      right ancestor SB);
    End;
  End;
  Else
  If node of the token is a negative beta-node
  Then Do;
    If token is from left
    Then Do;
      Do for each SB in the SB queue of the right
      ancestor;
        Form an augmented list by concatenating
        the list of class members (one class
        member in this case) from the SB with
        the list of class members from this-
        token;
        Execute the test associated with this
        node for the augmented list;
        If the test passed
        Then create and enqueue an SSBB pointing
        to the left and right ancestor SBs;
      End;
      If no test passed among tests for all right
      ancestor's SBs
      Then Call SET-SB-AND-SEND-ON(node of this-
      token, list from this-token, left
      ancestor SB, null);
    End;
    Else Do; /* token is from the right
      Do for each SB in the SB queue of the left
      ancestor;
        Form an augmented list by concatenating
        the list of class members from the SB
        with the list of class members (of
        length one) from this-token;
        Execute the test associated with this
        node for the augmented list;
        If the test passed
        Then Do;
          Create and enqueue an SSBB pointing to
          the left and right ancestor SBs;
          If there exist no other SSBBs enqueued
          off this node that refer to the same
          left ancestor SB
          Then Do;
            Locate the SB in the queue off this
            node that has the same class member
            list as the SB from the left
            ancestor node;
            Call DELETE-PROCESS(pointer to the SB
            enqueued off this node - as located
            above);
          End;
        End;
      End;
    End;
  End;
  Else
  If node of the token is a positive merge-node
  Then Do;
```

```
Do for each SB in the SB queue of the
ancestor in the opposite direction from
that of the arriving token;
Form an augmented list by concatenating the
list of class members from the SB with
the list of class members from this-
token;
Call SET-SB-AND-SEND-ON(node of this-token,
augmented list, left ancestor SB, right
ancestor SB);
End;
End;
Else
If node of the token is a negative merge-node
Then Do;
    If token is from left
    Then Do;
        Do for each SB in the SB queue of the right
        ancestor;
            Create and enqueue an SSBB pointing to
            the left and right ancestor SBs;
        End;
        If the right ancestor node's SB queue is
        empty
        Then Call SET-SB-AND-SEND-ON(node of this-
        token, list from this-token, left
        ancestor SB, null);
    End;
    Else Do; /* token is from the right
    Do for each SB in the SB queue of the left
    ancestor;
        Create and enqueue an SSBB pointing to
        the left and right ancestor SBs;
        If there exist no other SSBBs enqueued
        off this node that refer to the same
        left ancestor SB
        Then Do;
            Locate the SB in the queue off this
            node that has the same class member
            list as the SB from the left ancestor
            node;
            Call DELETE-PROCESS(pointer to the SB
            enqueued off this node - as located
            above);
        End;
    End;
    End;
End;
Else /* the node type must be a production node -
/* all other possibilities have been
/* exhausted
Do;
    Create a new instantiation made up of list of
    class members from the token and the rule
    associated with the node in the token;
End;
End of do while loop;
Return to caller
End MAKE-PROCESS;
```

There are several references in the above to the utility routine SET-SB-AND-SEND-ON. This routine accepts a node, a list of pointers to class members, a pointer to a left ancestor (possibly null), and a pointer to a right ancestor (possibly null). It does two things. First, it creates an SB from the list of pointers to class members, and it enqueues that SB off the passed node. Second, it loops through each successor node in the RETE network of the passed node, and for each it creates and pushes a token. A pseudo-code description follows:

```
SET-SB-AND-SEND-ON(parent-node,list-of-class-members,
left-ancestor-SB,
right-ancestor-SB):
Create an SB with list-of-class-members and enqueue
it off parent-node;
Do for each RETE node successor of parent-node;
Make a token
    with node being the successor
    with direction being the kind (left or right)
    of ancestor that the parent-node is to the
    successor
    with the list of class members being
    list-of-class-members;
Push the token on the token stack;
End;
End SET-SB-AND-SEND-ON;
```

It remains to outline the DELETE-PROCESS routine. This is called to delete all references in the RETE network to an SB, an SSBB, in instantiation, or a class member—which, for the purposes of the RETE algorithm, is a special kind of SB. DELETE-PROCESS is called and passed either a pointer to a class member or a pointer to an SB. If a class member is passed, then that class member is deleted from its class queue. If an SB is passed, then that SB is deleted from the SB queue in which it resided—while the integrity of all SB queues is maintained. Whether as SB or a class member is passed, DELETE-PROCESS proceeds to call itself recursively in order to eliminate all left and right descendant SBs.

Thinking of all the descendants of an SB as forming a tree, the recursive invocation of DELETE-PROCESS actually walks that tree in a depth-first manner and just before leaving a node in that tree (which is an SB), that SB is excised from all queues in which it resides and the SB is destroyed (i.e., the block of storage is freed):

```
DELETE-PROCESS(SB-to-delete):
/* recursively invoked where SB-to-delete is either
/* an SB or a class member to be deleted
If SB-to-delete has a left successor SB
Then Call DELETE-PROCESS(that left successor SB);
If SB-to-delete has a right successor SB
Then Call DELETE-PROCESS(that right successor SB);
Excise SB-to-delete from the doubly-linked queue of
all SBs off the node with which SB-to-delete is
associated;
If SB-to-delete has a left sibling SB
Then Do;
    If SB-to-delete has a left ancestor
    and if the left successor field of the left
    ancestor points to SB-to-delete
    Then reset that left successor field to point to
    a sibling of SB-to-delete;
    Excise SB-to-delete from its doubly-linked queue
    of left siblings;
    Call DELETE-PROCESS(left sibling of
    SB-to-delete);
End;
Else /* SB-to-delete is alone in the left sibling
/*queue
If SB-to-delete has a left ancestor
Then set the left successor field of that left
ancestor to null;
If SB-to-delete is an SSBB
(and it is known that SB-to-delete has a left
ancestor)
and there are no other SSBBs enqueued at
SB-to-delete's node that are left siblings of
SB-to-delete (i.e., same left anc)
Then Do;
    Call SET-SB-AND-SEND-ON(current node, class
    member list of SB-to-delete's left ancestor,
    SB-to-delete's left ancestor, SB-to-delete's
    right ancestor);
    Call MAKE-PROCESS;
End;
If SB-to-delete has a right sibling SB
Then Do;
    If SB-to-delete has a right ancestor
    and if the right successor field of the right
    ancestor points to SB-to-delete
```

-continued
```
Then reset that right successor field to point
to a sibling of SB-to-delete;
Excise SB-to-delete from its doubly-linked queue
of right siblings;
Call DELETE-PROCESS(right sibling of
SB-to-delete);
End;
Else /* SB-to-delete is alone in the right sibling
/* queue
If SB-to-delete has a right ancestor
Then set the right successor field of that right
ancestor to null;
If SB-to-delete is an SB rather than a class member
Then free SB-to-delete's storage block (and so
destroy SB-to-delete);
Return to caller;
End DELETE-PROCESS;
```

It will be further understood by those skilled in this art that various changes in form and detail may be made therein without departing from the spirit and scope of the invention.

What is claimed is:

1. A computer-implemented method for minimizing the number of data objects and pattern matchings occurring at the nodes of a flowgraph, each data object being manifest by coded indicia, said flowgraph being of the type in which the elements of a pattern are compiled into an acrylic-directed graph of entry and join nodes (FIG. 1), each pattern including coded indicia selected from a set consisting of single and compound elements, the entry nodes representing coded indicia of the single elements of the pattern, and join nodes representing coded indicia of compound elements, said entry and join nodes being connected in pattern-directed association (FIG. 1), comprising the steps of:
   (a) applying the data objects to the entry nodes of said flowgraph;
   at each node (entry nodes and join nodes):
   (b) performing a comparison match between the coded indicia of the data objects and the coded indicia of the node pattern elements;
   (c) maintaining a list of instantiations of objects satisfying the match conditions of pattern elements expressed at that node and passing tokens to descendant nodes;
   (d) maintaining pointers to all ancestor nodes through which the token for each object passed; and
   (e) traversing said pointers as a path for avoiding those flowgraph node pattern/object matchings redundant between a previously matched object and an object currently being processed.

2. A method for optimizing a cyclic, rule-based, data object sensitive production system, each data object being manifest by coded indicia, said system including means for storing data objects and rules, and means cooperating with the storage means for executing a control cycle, each rule having pattern indication and action specifying parts thereof, said pattern indication part specifying logical conditions between predetermined coded indicia and a data object, said logical conditions being selected from a set consisting of single and compound terms, said action specifying part selectively including changing the state of the production system (i.e., altering stored data objects, selecting another rule) or invoking facilities external to the system (i.e., calling a print facility), comprising the cyclic steps of:
   (a) identifying an executable subset of rules by matching the pattern parts of the rules to those data objects in the storage means modified or created during a preceding cycle;
   (b) selecting a rule from the identified rules; and
   (c) executing the action prescribed by the selected rule; wherein identification step (a) further comprises:
   (a1) compiling a data flowgraph of the logical conditions expressed in the pattern portion of the rule being matched, said flowgraph being formed from entry nodes and join nodes, the entry nodes representing those logical conditions constituting single terms and join nodes representing those logical conditions constituting compound terms arranged in a pattern-determined associative manner;
   (a2) applying those data objects created or modified in a preceding cycle to said flowgraph, and at each node (entry nodes and join nodes):
       maintaining a list of instantiations of objects satisfying the match conditions of the pattern portion of the rule expressed at that node,
       passing tokens to descendant nodes,
       maintaining pointers to all ancestor nodes through which the token for each object passed, and
       responsive to indication of object change, traversing said pointers as a path for avoiding those flowgraph node pattern/object matchings redundant between a previously matched object and an object currently being processed.

3. The method according to claim 2, wherein the data flowgraph is a RETE network and wherein the pattern-directed associative manner includes the steps of conforming nodes and links of the associative graph according to the logical conditions expressed in the pattern part of the rule, and further wherein the pattern-directed associative manner for arranging the join nodes in left associative.

4. The method according to claim 2, wherein the indication of object change includes creation, modification, or deletion of an object occasioned during the preceding cycle as defined by the steps (a)–(c) and applied to the flowgraph during the current cycle, and further wherein the deletion of an object includes deletion of instantiations maintained at the nodes visited by any traverse of the pointers.

* * * * *

UNITED STATES PATENT AND TRADEMARK OFFICE
CERTIFICATE OF CORRECTION

PATENT NO. : 4,849,905

DATED : July 18, 1989

INVENTOR(S) : D. J. Loeb and K. R. Milliken

It is certified that error appears in the above-identified patent and that said Letters Patent is hereby corrected as shown below:

Column 10, Line 52, after "exactly", insert --follows in the footsteps of an immediately preceding MAKE--.

Column 19, Line 28, change "acrylic" to --acyclic--.

Signed and Sealed this

Fifteenth Day of May, 1990

Attest:

HARRY F. MANBECK, JR.

*Attesting Officer*   *Commissioner of Patents and Trademarks*